United States Patent
Wang et al.

(10) Patent No.: US 11,855,928 B2
(45) Date of Patent: Dec. 26, 2023

(54) REFERENCE SIGNAL MANAGEMENT METHOD, APPARATUS, AND SYSTEM

(71) Applicant: HUAWEI TECHNOLOGIES CO., LTD., Guangdong (CN)

(72) Inventors: Xiaona Wang, Chengdu (CN); Peng Guan, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 148 days.

(21) Appl. No.: 17/390,484

(22) Filed: Jul. 30, 2021

(65) Prior Publication Data

US 2021/0359826 A1    Nov. 18, 2021

Related U.S. Application Data

(63) Continuation of application No. PCT/CN2020/070744, filed on Jan. 7, 2020.

(30) Foreign Application Priority Data

Feb. 1, 2019   (CN) .......................... 201910105846.4

(51) Int. Cl.
   *H04L 5/00*          (2006.01)
(52) U.S. Cl.
   CPC ............ *H04L 5/0092* (2013.01); *H04L 5/006* (2013.01); *H04L 5/0051* (2013.01)
(58) Field of Classification Search
   CPC ...... H04L 5/0051; H04L 5/006; H04L 5/0092
   See application file for complete search history.

(56) References Cited

U.S. PATENT DOCUMENTS

| 2017/0339675 A1 | 11/2017 | Liu et al. |
| 2018/0192384 A1 | 7/2018 | Chou et al. |

(Continued)

FOREIGN PATENT DOCUMENTS

| CN | 107615841 A | 1/2018 |
| CN | 107852293 A | 3/2018 |

(Continued)

OTHER PUBLICATIONS

3GPP TS 38.331 V15.4.0 (Dec. 2018), 3rd Generation Partnership Project; Technical Specification Group Radio Access Network; NR; Radio Resource Control (RRC) protocol specification(Release 15), 474 pages.

(Continued)

*Primary Examiner* — Derrick V Rose
(74) *Attorney, Agent, or Firm* — WOMBLE BOND DICKINSON (US) LLP

(57) ABSTRACT

Embodiments of the application disclose a reference signal management method, an apparatus, and a system, to resolve a problem of relatively large system overheads in an existing high frequency beam management process. A terminal device receives first information sent by a network device. The first information is used to indicate a first reference signal group that is on a first carrier, there is a correspondence between the first reference signal group that is on the first carrier and a first reference signal that is on a second carrier, and the first reference signal group that is on the first carrier includes at least two reference signals. The terminal device receives the first reference signal group that is on the first carrier and that is sent by the network device.

17 Claims, 4 Drawing Sheets

(56) References Cited

U.S. PATENT DOCUMENTS

| | | | |
|---|---|---|---|
| 2018/0262313 A1 | 9/2018 | Nam et al. | |
| 2019/0349159 A1* | 11/2019 | Nammi | H04L 1/0071 |
| 2020/0014514 A1* | 1/2020 | Gao | H04W 72/04 |
| 2021/0144716 A1* | 5/2021 | Choi | H04L 5/0025 |
| 2021/0351960 A1* | 11/2021 | Huang | H04W 72/23 |

FOREIGN PATENT DOCUMENTS

| | | |
|---|---|---|
| CN | 107888252 A | 4/2018 |
| CN | 108023697 A | 5/2018 |
| CN | 108540178 A | 9/2018 |
| CN | 108810922 A | 11/2018 |
| CN | 109151888 A | 1/2019 |

OTHER PUBLICATIONS

Huawei, HiSilicon, CSI-RS pattern design for up to 32 ports. 3GPP TSG RAN WG1 Meeting #85, Nanjing, China May 23-27, 2016, R1-164822, 8 pages.

3GPP TS 38.211 V15.4.0 (Dec. 2018), 3rd Generation Partnership Project; Technical Specification Group Radio Access Network; NR; Physical channels and modulation(Release 15), 96 pages.

NEC, Proposals for CSI-RS with OCC=2. 3GPP TSG RAN WG1 Meeting #83, Anaheim, USA, Nov. 15-22, 2015, R1-156680, 4 pages.

3GPP TS 38.212 V15.4.0 (Dec. 2018), 3rd Generation Partnership Project; Technical Specification Group Radio Access Network; NR; Multiplexing and channel coding(Release 15), 100 pages.

3GPP TS 38.213 V15.4.0 (Dec. 2018), 3rd Generation Partnership Project; Technical Specification Group Radio Access Network; NR; Physical layer procedures for control(Release 15), 104 pages.

3GPP TS 38.214 V15.4.0 (Dec. 2018), 3rd Generation Partnership Project; Technical Specification Group Radio Access Network; NR; Physical layer procedures for data(Release 15), 102 pages.

3GPP TS 38.321 V15.4.0 (Dec. 2018), 3rd Generation Partnership Project; Technical Specification Group Radio Access Network; NR; Medium Access Control (MAC) protocol specification(Release 15), 77 pages.

* cited by examiner

REFERENCE SIGNAL MANAGEMENT METHOD, APPARATUS, AND SYSTEM

CROSS-REFERENCE TO RELATED APPLICATIONS

This application is a continuation of International Application No. PCT/CN2020/070744, filed on Jan. 7, 2020, which claims priority to Chinese Patent Application No. 201910105846.4, filed on Feb. 1, 2019, The disclosures of the aforementioned applications are hereby incorporated by reference in their entireties.

TECHNICAL FIELD

Embodiments of the application relate to the field of communications technologies, and in particular, to a reference signal management method, an apparatus, and a system.

BACKGROUND

With development of communications technologies, a carrier aggregation (CA) manner based on high and low frequency coordination becomes an inevitable development trend of an architecture of a future new radio (NR) network. A working principle of the CA manner is as follows: A low frequency carrier is used as a primary carrier to transmit control signaling and relatively small data, and a high frequency carrier is used as a secondary carrier to transmit big data, to implement off loading, and meet requirements of the future NR network for higher data traffic, a faster user-perceived rate, and a lower latency.

When the high frequency carrier is used to transmit data, to avoid a problem of a relatively small coverage range caused by a relatively large high frequency path loss or a relatively large penetration loss, both a base station and a terminal device transmit data in an analog beamforming manner. For example, analog beamforming is performed on transmitted data by using an antenna array, to form a precise narrow analog beam, and the analog beam is sent to a peer end to obtain a longer coverage distance.

A plurality of analog beams may be formed between the base station and the terminal device, and signal quality of each analog beam may be different. To find an analog beam with optimal signal quality, the base station needs to periodically configure a large quantity of beam management resources (for example, reference signals on a high frequency carrier) that are on a high frequency carrier to the terminal device. The terminal device may need to measure beam management resources corresponding to all analog beams, find a proper analog beam from the plurality of analog beams based on a measurement result, and feed back the found analog beam to an access network device. Subsequently, data may be transmitted on the analog beam. In a beam management process, the access network device needs to configure the large quantity of beam management resources that are on the high frequency carrier. Consequently, system overheads are relatively large.

SUMMARY

Embodiments of the application provide a reference signal management method, an apparatus, and a system, to resolve a problem of relatively large system overheads in an existing high frequency beam management process.

To achieve the foregoing objective, the following technical solutions are applied to the embodiments of the application.

In an embodiment, a reference signal management method is provided. A terminal device receives first information that is sent by a network device and that is used to indicate a first reference signal group that is on a first carrier, and receives the first reference signal group that is sent by the network device and that is on the first carrier, where there is a correspondence between the first reference signal group that is on the first carrier and a first reference signal that is on a second carrier, and the first reference signal group includes at least two reference signals.

In an embodiment, the terminal device may receive, from the network device, reference signal groups that are on the first carrier and that correspond to reference signals that are on the second carrier, so that the terminal device determines, by measuring the reference signal groups that are on the first carrier, a reference signal with optimal signal quality in the reference signals that are on the second carrier, and transmits data in a direction of the reference signal with the optimal signal quality. In a process of managing the reference signals that are on the second carrier, the reference signals that are on the second carrier do not need to be configured. In an embodiment, when the first carrier is a low frequency carrier, and the second carrier is a high frequency carrier, a proper reference signal that is on the second carrier may be determined by measuring the reference signal groups that are on the first carrier, and a large quantity of reference signals that are on the second carrier do not need to be configured, thereby reducing system overheads. In addition, the terminal device does not need to enable a device channel for processing reference signals that are on a high frequency carrier, thereby reducing design complexity and power consumption of the terminal device.

In an embodiment, a band of the first carrier is lower than a band of the second carrier. Based on the possible design, a high-frequency beam may be maintained and managed by measuring a low-frequency reference signal, thereby reducing signal processing complexity of the terminal device.

In an embodiment, the first reference signal group that is on the first carrier includes a first-type reference signal, a direction of the first-type reference signal is the same as a direction of the first reference signal that is on the second carrier, and in the direction of the first-type reference signal, signal quality of the first-type reference signal is less than or equal to a preset threshold. Based on the possible design, a type of reference signals whose signal quality is less than or equal to the preset threshold in the direction of the first reference signal and another pre-coded reference signal may be combined, so that a characteristic of a combined reference signal group is consistent with a characteristic of the first reference signal that is on the second carrier.

In an embodiment, the first information includes the correspondence between the first reference signal group and the first reference signal, the first information includes a correspondence between a group identifier of the first reference signal group and an identifier of the first reference signal, or the first information includes a correspondence between an identifier of the first-type reference signal included in the first reference signal group and an identifier of the first reference signal. Based on the possible design, the correspondence between the group identifier of the first reference signal group and the identifier of the first reference signal, the correspondence between the identifier of the first-type reference signal included in the first reference signal group and the identifier of the first reference signal, or the like may be used to indicate the first reference signal that is on the second carrier and that corresponds to the first reference signal group that is on the first carrier. Indication manners are diversified, flexible, and easy to implement.

In an embodiment, the first information is used to indicate a plurality of first reference signal groups, and the plurality of first reference signal groups correspond to a plurality of first reference signals that are on the second carrier. The method further includes: The terminal device measures signal quality of the plurality of first reference signal groups, determines N first reference signal groups with optimal signal quality in the plurality of first reference signal groups, and sends feedback information to the network device, where N is a positive integer, and the feedback information is used to indicate N first reference signals corresponding to the N first reference signal groups. Based on the possible design, the terminal device may select, based on a measurement result of the first reference signal group that is on the first carrier, some first reference signals with optimal signal quality, and indicate the selected first reference signals to the network device, so that the network device transmits data in directions (or beam directions) of the selected first reference signals.

In an embodiment, the feedback information includes an identifier of each of the N first reference signals, the feedback information includes a group identifier of each of the N first reference signal groups, or the feedback information includes an identifier of a first-type reference signal included in each of the N first reference signal groups. Based on the possible design, the selected first reference signals may be indicated to the network device by using identifiers of the first reference signals, group identifiers of first reference signal groups, or identifiers of first-type reference signals included in first reference signal groups, thereby improving diversity and flexibility of indication manners.

In an embodiment, that the terminal device measures signal quality of the plurality of first reference signal groups includes: the terminal device uses a difference between a sum of signal quality of reference signals, other than the first-type reference signal, in each of the plurality of first reference signal groups and the signal quality of the first-type reference signal as the signal quality of each of the plurality of first reference signal groups. Based on the possible design, the terminal device may determine signal quality of a reference signal group by subtracting signal quality of a reference signal from a sum of signal quality of other reference signals in the reference signal group. This is simple and easy to implement.

In an embodiment, the terminal device receives a scheduling indication sent by the network device on the first carrier, where the scheduling indication is used to indicate to send downlink data in a direction of a target first reference signal, and the scheduling indication includes an identifier of the target first reference signal, a group identifier of a first reference signal group corresponding to the target first reference signal, or an identifier of a first-type reference signal included in a first reference signal group corresponding to the target first reference signal. The first reference signal group that is on the first carrier includes a plurality of first reference signals, and the target first reference signal may be one of the N first reference signals with optimal signal quality in the plurality of first reference signals. Based on the possible design, data (for example, downlink data or uplink data) may be sent in a direction of the first reference signal that is with the optimal signal quality and that is on the second carrier, thereby improving reliability and stability of data sending.

In an embodiment, the terminal device sends a scheduling request to the network device on the first carrier, where the scheduling request is used to request the network device to schedule an uplink transmission resource of the second carrier for the terminal device, and the scheduling request includes the identifier of the target first reference signal, the group identifier of the first reference signal group corresponding to the target first reference signal, or the identifier of the first-type reference signal included in the first reference signal group corresponding to the target first reference signal. The first reference signal that is on the first carrier includes a plurality of first reference signals, and the target first reference signal may be one of the N first reference signals with optimal signal quality in the plurality of first reference signals. Based on the possible design, when the terminal device needs to transmit uplink data on the second carrier, the terminal device may request the network device to schedule the uplink transmission resource of the second carrier, and send data in a direction corresponding to a first reference signal with optimal signal quality.

In an embodiment, the terminal device sends capability information of the terminal device to the network device, where the capability information of the terminal device is used to indicate that the terminal device has a capability of determining the first reference signal that is on the second carrier by measuring the first reference signal group that is on the first carrier. Based on the possible design, after receiving the capability information of the terminal device, the network device may determine that the terminal device has the capability of determining the first reference signal that is on the second carrier by measuring the first reference signal group that is on the first carrier, and may implement beam management of the second carrier by using the first reference signal group that is on the first carrier.

In an embodiment, the terminal device receives capability information of the network device sent by the network device, where the capability information of the network device is used to indicate that the network device has a capability of sending the first reference signal group that is on the first carrier in the direction of the first reference signal that is on the second carrier. Based on the possible design, the terminal device may determine, based on the received capability information of the network device, that the network device sends a reference signal that is on the first carrier in the direction of the first reference signal that is on the second carrier, but does not send the first reference signal that is on the second carrier, and the terminal device does not need to receive and measure the first reference signal that is on the second carrier, so that the terminal device disables a radio frequency module (or a baseband processing module) that is of the terminal device and that is configured to receive the first reference signal that is on the second carrier, or a radio frequency module configured to receive the first reference signal that is on the second carrier is not designed in the terminal device, to reduce power consumption and design complexity of the terminal device.

In an embodiment, a communications apparatus is provided. The communications apparatus may be a terminal device or a chip or a system-on-a-chip in a terminal device, or may be a functional module that is in a terminal device and that is configured to implement methods according to embodiments, as described herein. The communications apparatus may implement functions performed by the terminal device according to embodiments, as described herein, and the functions may be implemented by hardware executing corresponding software. The hardware or the software includes one or more modules corresponding to the functions. For example, the communications apparatus may include a receiving unit and a processing unit.

The receiving unit receives first information that is sent by a network device and that is used to indicate a first reference signal group that is on a first carrier, where there is a correspondence between the first reference signal group that is on the first carrier and a first reference signal that is on a second carrier, and the first reference signal group that is on the first carrier includes at least two reference signals.

The processing unit is configured to obtain the first information.

The receiving unit is further configured to receive the first reference signal group that is on the first carrier and that is sent by the network device.

For an embodiment of the communications apparatus, refer to behavior functions of the terminal device in the reference signal management method provided according to embodiments, as described herein. Embodiments of the method may be correspondingly implemented by the processing unit and a sending unit included in the communications apparatus. Details are not described herein again. The provided communications apparatus can achieve beneficial effects as described herein.

In an embodiment, a communications apparatus is provided. The communications apparatus may be a terminal device or a chip or a system-on-a-chip in a terminal device. The communications apparatus may implement functions performed by the terminal device according to embodiments, as described herein, and the functions may be implemented by hardware. For example, in a possible design, the communications apparatus may include a processor and a communications interface. The processor may be configured to support the communications apparatus in implementing the functions in any one of embodiments, as described herein. For example, the processor may receive, by using the communications interface, first information that is sent by the network device and that is used to indicate the first reference signal group that is on the first carrier, and receive the first reference signal group that is on the first carrier and that is sent by the network device, where there is a correspondence between the first reference signal group that is on the first carrier and the first reference signal that is on the second carrier, and the first reference signal group that is on the first carrier includes at least two reference signals. In another possible design, the communications apparatus may further include a memory. The memory is configured to store computer-executable instructions and data for the communications apparatus. When the communications apparatus runs, the processor executes computer-executable instructions stored in the memory, so that the communications apparatus performs the reference signal management method according to embodiments, as described herein.

In an embodiment, a computer-readable storage medium is provided. The computer-readable storage medium may be a readable non-volatile storage medium, and the computer-readable storage medium stores instructions. When the instructions are run on a computer, the computer is enabled to perform the reference signal management method according to embodiments, as described herein.

In an embodiment, a computer program product including instructions is provided. When the computer program product runs on a computer, the computer is enabled to perform the reference signal management method according to embodiments, as described herein.

In an embodiment, a communications apparatus is provided. The communications apparatus may be a terminal device or a chip or a system-on-a-chip in a terminal device. The communications apparatus includes one or more processors and one or more memories. The one or more memories are coupled to the one or more processors, and the one or more memories are configured to store computer program code. The computer program code includes computer instructions, and when the one or more processors execute the computer instructions, the communications apparatus is enabled to perform the reference signal management method according to embodiments, as described herein.

An embodiment of the application provides a reference signal management method. The method includes: A network device sends first information and a first reference signal group that is on a first carrier to a terminal device, where the first information is used to indicate the first reference signal group that is on the first carrier, there is a correspondence between the first reference signal group that is on the first carrier and a first reference signal that is on a second carrier, and the first reference signal group that is on the first carrier includes at least two reference signals.

In an embodiment, the network device may send, to the terminal device, reference signal groups that are on the first carrier and that correspond to reference signals that are on the second carrier, so that the terminal device determines, by measuring the reference signal groups that are on the first carrier, a reference signal with optimal signal quality in the reference signals that are on the second carrier, and transmits data in a direction of the reference signal with the optimal signal quality. In a process of managing the reference signals that are on the second carrier, the reference signals that are on the second carrier do not need to be configured. In an embodiment, when the first carrier is a low frequency carrier, and the second carrier is a high frequency carrier, a proper reference signal that is on the second carrier may be determined by measuring the reference signal groups that are on the first carrier, and a large quantity of reference signals that are on the second carrier do not need to be configured, thereby reducing system overheads. In addition, the terminal device does not need to enable a device channel for processing reference signals that are on a high frequency carrier, thereby reducing design complexity and power consumption of the terminal device.

In an embodiment, a band of the first carrier is lower than a band of the second carrier. Based on the possible design, a high-frequency beam may be maintained and managed by measuring a low-frequency reference signal, thereby reducing signal processing complexity of the terminal device.

In an embodiment, the first reference signal group that is on the first carrier includes a first-type reference signal, a direction of the first-type reference signal is the same as a direction of the first reference signal that is on the second carrier, and in the direction of the first-type reference signal, signal quality of the first-type reference signal is less than or equal to a preset threshold. Based on the possible design, a type of reference signals whose signal quality is less than or equal to the preset threshold in the direction of the first reference signal and another pre-coded reference signal may be combined, so that a characteristic of a combined reference signal group is consistent with a characteristic of the first reference signal that is on the second carrier.

In an embodiment, the first information includes the correspondence between the first reference signal group and the first reference signal, the first information includes a correspondence between a group identifier of the first reference signal group and an identifier of the first reference signal, or the first information includes a correspondence between an identifier of the first-type reference signal included in the first reference signal group and an identifier of the first reference signal. Based on the possible design, the first reference signal group that is on the first carrier corresponding to the first reference signal that is on the second carrier may be indicated in a plurality of manners, and the indication manner is flexible and simple for implementation.

In an embodiment, the first information is used to indicate a plurality of first reference signal groups, and the plurality of first reference signal groups correspond to a plurality of first reference signals that are on the second carrier. The method further includes: The network device receives feedback information sent by the terminal device. The feedback information is used to indicate N first reference signals corresponding to N first reference signal groups, where the feedback information includes an identifier of each of the N first reference signals; the feedback information includes a group identifier of each of the N first reference signal groups; or the feedback information includes an identifier of a first-type reference signal included in each of the N first reference signal groups. Based on the possible design, the first reference signal that is on the selected second carrier may be indicated in a plurality of manners, and the indication manners are diverse and simple for implementation.

In an embodiment, the network device sends a scheduling indication to the terminal device on the first carrier, where the scheduling indication is used to indicate to send downlink data in a direction of a target first reference signal, and the scheduling indication includes an identifier of the target first reference signal, a group identifier of a first reference signal group corresponding to the target first reference signal, or an identifier of a first-type reference signal included in a first reference signal group corresponding to the target first reference signal. The first reference signal that is on the first carrier includes a plurality of first reference signals, and the target first reference signal may be one of N first reference signals with optimal signal quality in the plurality of first reference signals. Based on the possible design, data (for example, downlink data or uplink data) may be sent in a direction of a first reference signal that is with optimal signal quality on the second carrier and that is determined by the terminal device, thereby improving reliability and stability of data sending.

In an embodiment, the network device receives a scheduling request sent by the terminal device on the first carrier, where the scheduling request is used to request the network device to schedule an uplink transmission resource of the second carrier for the terminal device, and the scheduling request includes the identifier of the target first reference signal, the group identifier of the first reference signal group corresponding to the target first reference signal, or the identifier of the first-type reference signal included in the first reference signal group corresponding to the target first reference signal. The first reference signal that is on the first carrier includes a plurality of first reference signals, and the target first reference signal may be one of N first reference signals with optimal signal quality in the plurality of first reference signals. Based on the possible design, when the terminal device needs to transmit uplink data on the second carrier, the terminal device may request the network device to schedule the uplink transmission resource of the second carrier, and send data in a direction corresponding to a first reference signal with optimal signal quality.

In an embodiment, the network device receives capability information that is of the terminal device and that is sent by the terminal device, where the capability information of the terminal device is used to indicate that the terminal device has a capability of determining the first reference signal that is on the second carrier by measuring the first reference signal group that is on the first carrier. Based on the possible design, after receiving the capability information of the terminal device, the network device may determine that the terminal device has the capability of determining the first reference signal that is on the second carrier by measuring the first reference signal group that is on the first carrier. Subsequently, the network device may implement beam management of the second carrier by configuring the first reference signal group that is on the first carrier.

In an embodiment, the network device sends capability information of the network device to the terminal device, where the capability information of the network device is used to indicate that the network device has a capability of sending the first reference signal group that is on the first carrier in the direction of the first reference signal that is on the second carrier. Based on the possible design, the terminal device may determine, based on the received capability information of the network device, that the network device sends a reference signal that is on the first carrier in the direction of the first reference signal that is on the second carrier, but does not send the first reference signal that is on the second carrier. Subsequently, the terminal device may disable a radio frequency module (or a baseband processing module) configured to receive the first reference signal that is on the second carrier, or a radio frequency module configured to receive the first reference signal that is on the second carrier is not designed in the terminal device, to reduce power consumption and design complexity of the terminal device.

In an embodiment, a communications apparatus is provided. The communications apparatus may be a network device, or a chip or a system-on-a-chip in a network device. The communications apparatus may implement functions performed by the network device according to embodiments, as described herein, and the functions may be implemented by hardware executing corresponding software. The hardware or the software includes one or more modules corresponding to the functions. For example, the communications apparatus may include a processing unit and a sending unit.

The processing unit is configured to determine first information, where the first information is used to indicate a first reference signal group that is on a first carrier, there is a correspondence between the first reference signal group that is on the first carrier and a first reference signal that is on a second carrier, and the first reference signal group that is on the first carrier includes at least two reference signals.

The sending unit is configured to send the first information and the first reference signal group that is on the first carrier to the terminal device.

In an embodiment, a communications apparatus is provided. The communications apparatus may be a network device, or a chip or a system-on-a-chip in a network device. The communications apparatus may implement functions performed by the network device according to embodiments, as described herein, and the functions may be implemented by hardware. For example, in a possible design, the communications apparatus may include a processor and a communications interface. The processor sends first information and a first reference signal group that is on a first carrier to a terminal device, where the first information is used to indicate the first reference signal group that is on the first carrier, there is a correspondence between the first reference signal group that is on the first carrier and a first reference signal that is on a second carrier, and the first reference signal group that is on the first carrier includes at least two reference signals. In still another possible design, the communications apparatus further includes a memory. The memory is configured to store computer-executable instructions and data for the communications apparatus. When the communications apparatus runs, the processor executes the computer-executable instructions stored in the memory, so that the communications apparatus performs the reference signal management method according to embodiments, as described herein.

In an embodiment, a computer-readable storage medium is provided. The computer-readable storage medium may be a readable non-volatile storage medium, and the computer-readable storage medium stores instructions. When the instructions are run on a computer, the computer is enabled to perform the reference signal management method according to embodiments, as described herein.

In an embodiment, a computer program product including instructions is provided. When the computer program product runs on a computer, the computer is enabled to perform the reference signal management method according to embodiments, as described herein.

In an embodiments, a communications apparatus is provided. The communications apparatus may be a network device, or a chip or a system-on-a-chip in a network device. The communications apparatus includes one or more processors and one or more memories. The one or more memories are coupled to the one or more processors, and the one or more memories are configured to store computer program code. The computer program code includes computer instructions, and when the one or more processors execute the computer instructions, the communications apparatus is enabled to perform the reference signal management method according to embodiments as described herein.

In an embodiment, a reference signal management system is provided. The system may include the terminal device and the network device according to embodiments as described herein.

DESCRIPTION OF EMBODIMENTS

A principle of embodiments of the application is as follows: A reference signal group that is on a low frequency carrier and that corresponds to a reference signal that is on a high frequency carrier is configured for a terminal device, where the reference signal group that is on the low frequency carrier may include at least two reference signals that are on the low frequency carrier, and transmission characteristics (for example, a direction and signal quality) of the reference signal group that is on the low frequency carrier are consistent with transmission characteristics of the reference signal that is on the high frequency carrier. Subsequently, the terminal device may determine (for example, manage and maintain) an analog beam used to send the reference signal that is on the high frequency carrier by measuring the reference signal group that is on the low frequency carrier. In this way, a large quantity of reference signals that are on a high frequency carrier do not need to be configured to manage and maintain the analog beam, thereby reducing system overheads.

Figure 1:
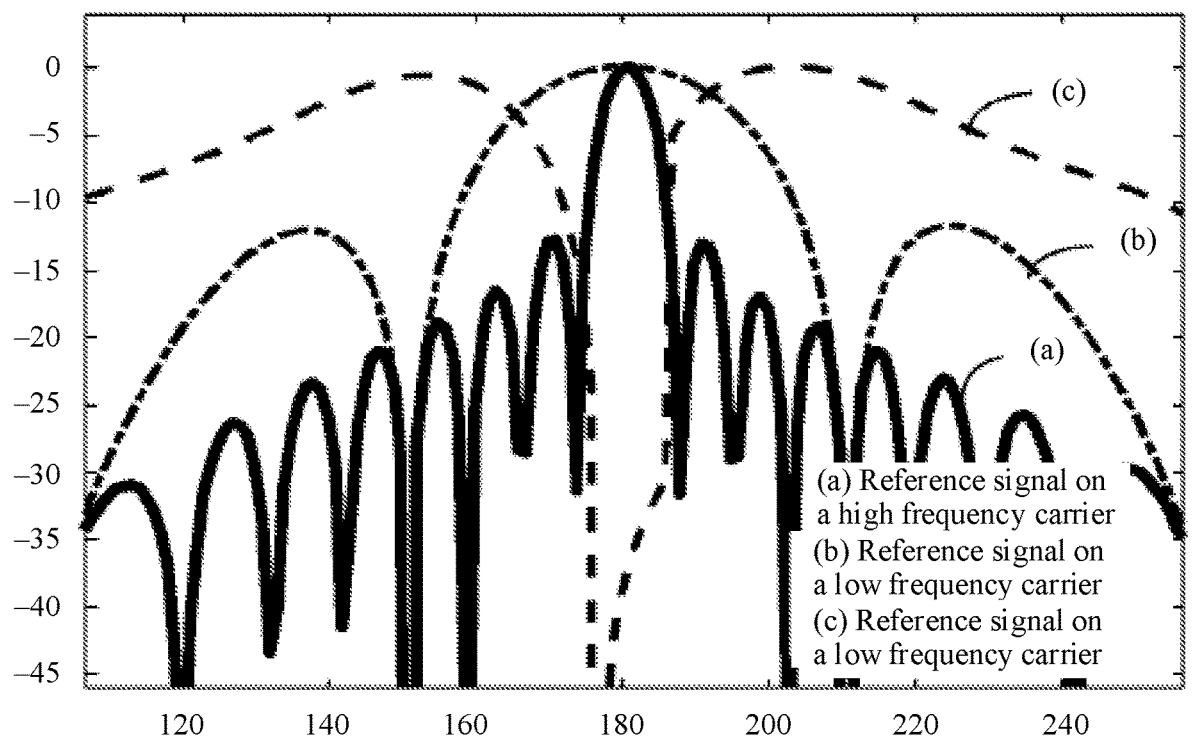
FIG. 1 is a schematic diagram of a principle according to an embodiment of the application.

For example, FIG. 1 is a schematic diagram of a principle according to an embodiment of the application. As shown in FIG. 1, a horizontal axis represents a direction of a reference signal, and a vertical axis represents signal quality of a normalized reference signal, where (a) is a reference signal that is on a high frequency carrier, (b) is a reference signal that is on a low frequency carrier, and (c) is a reference signal that is on a low frequency carrier. Directions (or main path directions) of (a), (b), and (c) are the same, and are all in a 180-degree direction. In the main path direction, signal quality of (b) is relatively good (for example, the signal quality of (b) is close to 0 dBm), and the main path direction of (b) covers the main path direction of (a). In the main path direction, signal quality of (c) is relatively poor (for example, the signal quality of (c) is close to −45 dBm), and (c) is nulled in the main path direction. In FIG. 1, in a coverage range centered at the 180-degree direction (for example, within a coverage range of the 150-degree direction to the 210-degree direction), the signal quality of (b) subtracted by the signal quality of (c) is approximately equal to the signal quality of (a). In other words, signal strength of the reference signal that is on the high frequency carrier in the main path direction can be estimated by subtracting the signal quality of the reference signal that is on the low frequency carrier and that is nulled in the main path direction from the signal quality of the reference signal that is on the low frequency carrier and whose main path direction covers the main path direction. In addition, the reference signal that is on the low frequency carrier and whose main path direction covers the main path direction and the reference signal that is on the low frequency carrier and that is nulled in the main path direction may be combined to narrow a beam range in the main path direction, to construct a direction (for example, a direction of an analog beam on the high frequency carrier) of a narrow beam. Therefore, when a beam used to send the reference signal (a) on the high frequency carrier is managed and maintained, (a) may not need to be configured, but only a group of reference signals (b) and (c) on the low frequency carrier that correspond to (a) need to be configured. The signal quality of (a) is inferred by measuring the signal quality of (b) and (c), to manage and maintain an analog beam used to transmit a reference signal that is on a high frequency carrier.

The following describes, based on the foregoing principle, the method provided in the embodiments of the application.

Before the embodiments of the application are described, terms used in the embodiments of the application are described as follows.

A high frequency carrier may be a frequency domain resource in a high frequency range, for example, may be a band or a carrier in the high frequency range, or may be a bandwidth part (BWP) or another frequency domain resource in the high frequency range. The high frequency range may be a frequency range above 6 gigahertz (GHz), for example, may be a frequency range 2 (FR2) specified in the 3rd generation partnership project 3GPP release 15.

A low frequency carrier may be a frequency domain resource in a low frequency range, for example, may be a carrier in the low frequency range, or may be a BWP or another frequency domain resource in the low frequency range. The low frequency range may be a frequency range below or equal to 6 GHz, for example, may be a frequency range 1 (FR1) specified in the 3GPP release 15. It should be noted that the high frequency carrier and the low frequency carrier are relative concepts. A band of a high frequency carrier may be higher than that of a low frequency carrier. In this embodiment of the application, a carrier in a frequency range above 6 GHz is referred to as a high frequency carrier, and a carrier in a frequency range below or equal to 6 GHz is referred to as a low frequency carrier. Alternatively, a carrier in a frequency range above a preset band may be referred to as a high frequency carrier, and a carrier in a frequency range below or equal to the preset band may be referred to as a low frequency carrier. The preset band may be set as required, and is not limited.

A reference signal is directional, and a direction of the reference signal is consistent with a direction of a beam used to send the reference signal. In the embodiments of the application, managing and maintaining the reference signal may be further described as managing and maintaining the beam used to send the reference signal. The reference signal may be a pre-coded or beamformed reference signal, or may be a beam management resource used for beam management. For example, the reference signal may be a channel state information reference signal (CSI-RS), a synchronization signal block (SSB), another reference signal, or the like. The reference signal may be uniquely identified by an identifier (ID) of the reference signal, and IDs of different reference signals are different. The ID of the reference signal may be an index of the reference signal or any combination of letters, Chinese characters, indexes, special characters, and the like that are easily identified, understood, and memorized by a user, or may be an index, a number of a functional network element, or the like. Related information of each reference signal and an ID of the reference signal may be preconfigured for a terminal device and a network device (for example, an access network device), or may be pre-specified in a protocol.

In an example, a type of the reference signal may be classified into a reference signal that is on a high frequency carrier and a reference signal that is on a low frequency carrier based on a type of a carrier carried in the reference signal. Reference signals that are on different carriers may correspond to different identifiers (ID), and IDs corresponding to different reference signals that are on a same carrier may be different.

In still another example, the reference signal may be classified, based on energy of the reference signal in a particular direction, into the following different types: a nulled reference signal and a pre-coded reference signal. The pre-coded reference signal may be further described as a beamformed reference signal, and the pre-coded reference signal may be a reference signal with relatively high signal quality in a particular direction. In at least some embodiments, for related descriptions of the pre-coded reference signal, refer to descriptions in a conventional technology, and details are not described again. For related descriptions of the nulled reference signal, refer to the following.

A nulled reference signal may be referred to as a nulled beam. The nulled reference signal may be a reference signal with relatively low signal quality in a particular direction, for example, may be a type of reference signals whose signal quality in a particular direction is zero or less than or equal to a preset threshold (X dBm), where, for example, X=−20. For example, (c) in FIG. 1 is a nulled signal that is on a low frequency carrier. When a transmit end sends the nulled reference signal, a transmit antenna does not radiate an electromagnetic wave in a particular direction, so that energy in the direction is the lowest. The nulled beam may be determined by a nulled beam width and a nulled depth. The nulled beam width may be a 3 dB beam width, and may be determined by an angle between power points Y times greater than the lowest power, where, for example, Y=2, or may be determined by an angle between two highest power points. The nulled depth can be determined by a difference between the highest power and the lowest power. Usually, a nulled beam may be generated by using different transmit antenna weights, so that phases between two sent signals are mutually canceled.

It should be noted that naming of the nulled reference signal is not limited in this embodiment of the application. In an embodiment, the nulled reference signal may alternatively be referred to as a first-type reference signal or another reference signal. This is not limited.

A beam is a communication resource. The beam may be a wide beam, a narrow beam, or another type of beam. A technology for forming the beam may be a beamforming technology or another technology. The beamforming technology may be a digital beamforming technology, an analog beamforming technology, or a hybrid digital/analog beamforming technology. Different beams may be considered as different resources. Same information or different information may be sent by using different beams. In an embodiment, a plurality of beams with a same communication feature or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted by using an antenna, and a receive beam may be distribution of signal strength, in different directions in space, of a radio signal received from an antenna. It can be understood that the one or more antenna ports forming the beam may alternatively be considered as one antenna port set. In a protocol, the beam can also be embodied as a spatial filter.

Quasi-co-location (QCL): A quasi-co-location relationship is used to indicate that a plurality of resources have one or more same or similar communication features. A same or similar communication configuration may be used for the plurality of resources having the quasi-co-location relationship. For example, if two antenna ports have the quasi-co-location relationship, a large-scale channel property in which one port transmits a symbol may be inferred from a large-scale channel property in which the other port transmits a symbol. The large-scale property may include delay spread, an average delay, Doppler spread, a Doppler frequency shift, an average gain, a receive parameter, a receive beam index of a terminal device, transmit/receive channel correlation, an angle of arrival, spatial correlation of a receiver antenna, an angle of arrival (AoA), an average angle of arrival, AoA spread, and the like.

Beam indication information is used to indicate a beam used for transmission, and the beam includes a transmit beam and/or a receive beam. The beam indication information includes at least one of a beam index, a beam management resource index, an uplink signal resource index, a downlink signal resource index, an absolute index of a beam, a relative index of a beam, a logical index of a beam, an index of an antenna port corresponding to a beam, an index of an antenna port group corresponding to a beam, an index of a downlink signal corresponding to a beam, a time index of a downlink synchronization signal block corresponding to a beam, beam pair link (BPL) information, a transmit parameter (Tx parameter) corresponding to a beam, a receive parameter (Rx parameter) corresponding to a beam, a transmit weight corresponding to a beam, a weight matrix corresponding to a beam, a weight vector corresponding to a beam, a receive weight corresponding to a beam, an index of a transmit weight corresponding to a beam, an index of a weight matrix corresponding to a beam, an index of a weight vector corresponding to a beam, an index of a receive weight corresponding to a beam, a reception codebook corresponding to a beam, a transmit codebook corresponding to a beam, an index of a reception codebook corresponding to a beam, and an index of a transmit codebook corresponding to a beam, where the downlink signal includes any one of a synchronization signal, a broadcast channel, a broadcast signal demodulation signal, a channel state information reference signal (CSI-RS), a cell-specific reference signal (CS-RS), a UE-specific reference signal (US-RS), a downlink control channel demodulation reference signal, a downlink data channel demodulation reference signal, and a downlink phase noise tracking signal. An uplink signal includes any one of an uplink random access sequence, an uplink sounding reference signal, an uplink control channel demodulation reference signal, an uplink data channel demodulation reference signal, or an uplink phase noise tracking signal. In an embodiment, the network device may further allocate a QCL identifier to beams that have a QCL relationship and that are in beams associated with a frequency resource group. The beam may also be referred to as a spatial transmission filter, the transmit beam may also be referred to as a spatial transmit filter, and the receive beam may also be referred to as a spatial receive filter. The beam indication information may be further represented as a transmission configuration index (TCI). The TCI may include a plurality of parameters such as a cell index, a bandwidth part index, a reference signal identifier, a synchronization signal block identifier, and a QCL type.

Beam management resource: a resource used for beam management, or may be embodied as a resource used for calculating and measuring a beam quality. The beam quality includes a layer 1 reference signal received power (L1-RSRP), layer 1 reference signal received quality (L1-RSRQ), a layer 1 signal to interference plus noise ratio (L1-SINR), and the like. In at least some embodiments, the beam management resource may include a synchronization signal, a broadcast channel, a downlink channel measurement reference signal, a tracking signal, a downlink control channel demodulation reference signal, a downlink shared channel demodulation reference signal, an uplink sounding reference signal, an uplink random access signal, and the like.

Carrier aggregation (CA): To efficiently use a fragmented spectrum, a system supports aggregation of different component carriers. A technology in which two or more carriers are aggregated to support a larger transmission bandwidth may be referred to as the carrier aggregation. Carrier aggregation is specific to a terminal device. Different terminal devices may configure a plurality of different carrier components (CC), and each CC may correspond to an independent cell. In the embodiments of the application, one CC may be equivalent to one cell. A type of cells may be classified into the following types: a primary cell (PCell) and a secondary cell (SCell).

The primary cell is a master cell group (MCG) cell that works on a primary band, and is used by a terminal device to perform an initial connection or reestablish a connection. The primary cell corresponds to a primary CC (which may also be referred to as a primary carrier), and may be a cell for initial connection establishment for the terminal device, a cell for radio resource control (RRC) connection reestablishment, or a primary cell specified in a handover process. The secondary cell corresponds to a secondary CC (which may also be referred to as a secondary carrier), and may be a cell that is added during RRC reconfiguration and that is used to provide an additional radio resource.

The secondary cell is a cell that provides an additional radio resource in addition to a special cell if a CA function is configured for a terminal device.

It should be noted that, for a terminal device in a connected mode, if the carrier aggregation is not configured, the terminal device has one serving cell; or if the carrier aggregation is configured, the terminal device may have a plurality of serving cells that may be referred to as a serving cell set. For example, the serving cell set of the terminal device includes the primary cell and the secondary cell. In other words, the serving cell set includes at least one primary cell and at least one secondary cell. In other words, the terminal device configured with the carrier aggregation may correspond to one primary cell and a plurality of secondary cells.

The reference signal management method according to this embodiment of the application may be applied to a communications system including a high frequency carrier and a low frequency carrier. The communications system may be a cellular communications system, may be a long term evolution (LTE) system, or may be a fifth generation (5G) mobile communications system or a new radio (NG) system, or may be another mobile communications system. This is not limited. The following uses only a communications system shown in FIG. 2 as an example to describe the method provided in embodiments of the application.

Figure 2:
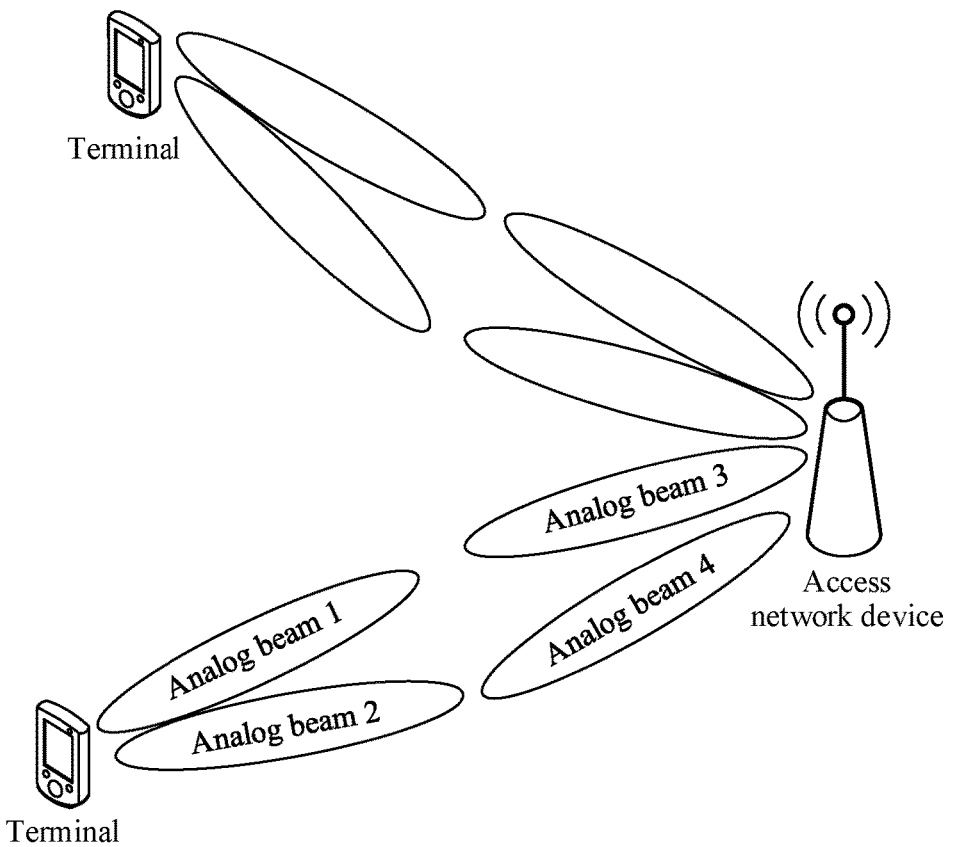
FIG. 2 is a schematic diagram of a communications system according to an embodiment of the application.

FIG. 2 is a schematic architectural diagram of a communications system according to an embodiment of the application. As shown in FIG. 2, the communications system may include an access network device and a plurality of terminal devices. The terminal device may communicate with the access network device by using a high frequency carrier, may communicate with the access network device by using a low frequency carrier, or may communicate with the access network device in a CA manner based on coordination between a low frequency carrier and a high frequency carrier. In a scenario in which the terminal device communicates with the access network device by using the high frequency carrier, the terminal device and the access network device may send and receive data on a plurality of beam pairs formed between the terminal device and the access network device by using a beamforming technology. For example, as shown in FIG. 2, the terminal device may generate a plurality of receive beams (an analog beam 1 and an analog beam 2 in FIG. 2) by using a beamforming technology. The access network device may generate a plurality of transmit beams (an analog beam 3 and an analog beam 4 in FIG. 2) by using a beamforming technology. A plurality of beam pairs may be formed by the transmit beams of the access network device and the receive beams of the terminal device. For example, an analog beam pair may be formed by the analog beam 1 and the analog beam 3, an analog beam pair may be formed by the analog beam 2 and the analog beam 4, and an analog beam pair may be formed by the analog beam 1 and the analog beam 4. When the access network device determines to transmit data by using an analog beam, the access network device may configure a group of reference signals on a low frequency carrier that correspond to a reference signal that is on a high frequency carrier, and send the reference signal group that is on the low frequency carrier to the terminal device on a transmit beam of the access network device. The terminal device traverses all receive beams of the terminal device to receive the reference signals that are on the low frequency carrier and that are sent by the access network device, selects a proper transmit beam (where, for example, a transmit beam with relatively good quality in transmit beams of the access network device) of the access network device by measuring the received reference signals that are on the low frequency carrier, and indicates a selection result to the access network device, so that the access network device transmits data on the selected transmit beam. Compared with a conventional technology in which an access network device needs to manage and maintain beams by sending a reference signal that is on a high frequency carrier on each transmit beam, this method avoids a problem of large system overheads caused by configuring reference signals that are on a high frequency carrier. In at least some embodiments, for the implementation process, refer to descriptions in the embodiment corresponding to FIG. 4 below.

The terminal device in FIG. 2 may be referred to as terminal equipment, user equipment (UE), a mobile station (MS), a mobile terminal (MT), or the like, and may be deployed on water (for example, a ship), or may be deployed in the air (for example, an airplane, a balloon, and a satellite). In at least some embodiments, the terminal device in FIG. 2 may be a mobile phone, a tablet computer, or a computer having a wireless transceiver function. The terminal device may be a virtual reality (VR) terminal device, an augmented reality (AR) terminal device, a wireless terminal device in industrial control, a wireless terminal device in unmanned driving, a wireless terminal device in telemedicine, a wireless terminal device in a smart grid, a wireless terminal device in a smart city, a wireless terminal device in a smart home, or the like. In this embodiment of the application, an apparatus configured to implement a function of a terminal device may be a terminal device, or may be an apparatus, for example, a chip system, that can support a terminal device in implementing the function. In this embodiment of the application, the chip system may include a chip, or may include a chip and another discrete component. In the technical solution provided in this embodiment of the application, an example in which the apparatus configured to implement the function of the terminal device is a terminal device is used to describe the technical solution provided in this embodiment of the application.

The access network device in FIG. 2 may be referred to as a network device, and is mainly configured to implement functions such as a radio physical control function, resource scheduling and radio resource management, radio access control, and mobility management. In at least some embodiments, the access network device may be an access network (AN) device/a radio access network (RAN) device, may be a device including a plurality of 5G-AN/5G-RAN nodes, or may be any node of a NodeB (NB), an evolved NodeB (eNB), a next generation NodeB (gNB), a transmission reception point (TRP), a transmission point (TP), or another access node. In this embodiment of the application, an apparatus configured to implement a function of a network device may be an access network device, or may be an apparatus, for example, a chip system, that can support an access network device in implementing the function. This is not limited.

It should be noted that FIG. 2 is merely a figure as an example. A quantity of devices included in FIG. 2 is not limited. In addition to the devices shown in FIG. 2, the communications architecture may further include another device, for example, may further include a core network device or a data network. In addition, a name of each device in FIG. 2 is not limited. In addition to the names shown in FIG. 2, each device may be named another name. This is not limited. In addition, in this embodiment of the application, a transmit beam and a receive beam are relative concepts. A beam used to send a reference signal is a transmit beam, and may refer to distribution of signal strengths formed in different directions in space after the reference signal is transmitted by using an antenna. A beam used to receive a reference signal is a receive beam, and may refer to distribution of signal strengths formed in different directions in space after the reference signal is received by using an antenna.

Figure 3:
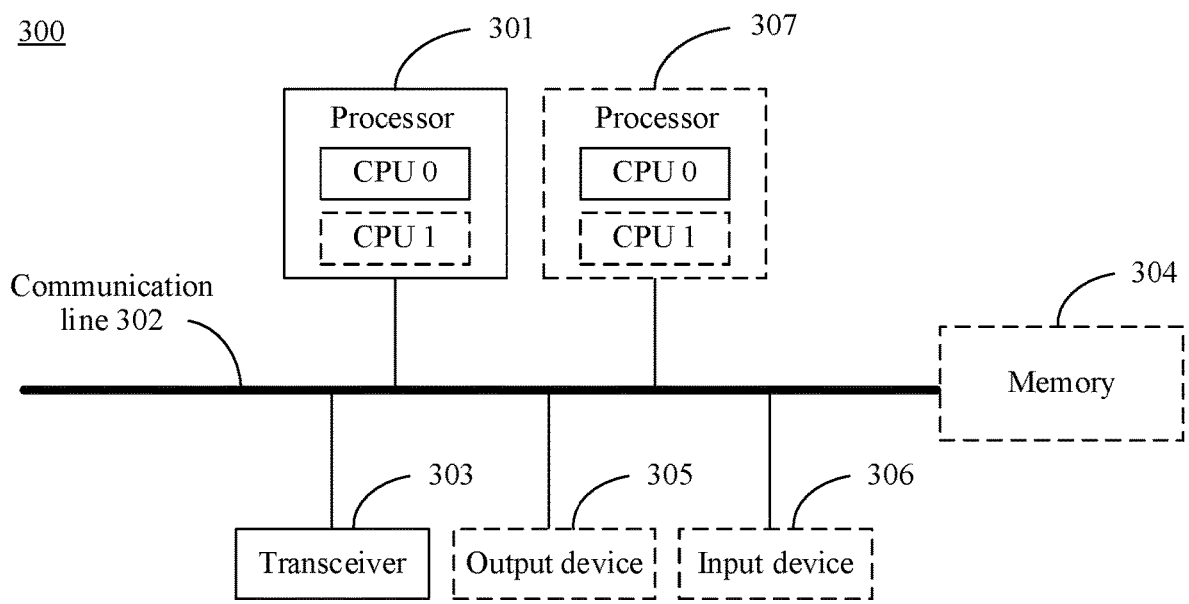
FIG. 3 is a schematic composition diagram of a communications apparatus according to an embodiment of the application.

In an embodiment, the devices shown in FIG. 2 have components shown in FIG. 3. FIG. 3 is a schematic composition diagram of a communications apparatus according to an embodiment of the application. When the communications apparatus performs a function of the terminal device in the method embodiment, the communications apparatus may be a terminal device or a chip or a system-on-a-chip in the terminal device. When the communications apparatus performs a function of the access network device in the method embodiment, the communications apparatus may be an access network device or a chip or a system-on-a-chip in the access network device. As shown in FIG. 3, the communications apparatus 300 includes at least one processor 301, a communication line 302, and at least one transceiver 303. Further, the communications apparatus shown in FIG. 3 may further include a memory 304. The processor 301, the memory 304, and the transceiver 303 may be connected to each other through the communication line 302. In the embodiments of the application, "at least one" may be one, two, three, or more. This is not limited in embodiments of the application.

In an embodiment, the processor 301 may be a central processing unit (CPU), a general-purpose processor, a network processor (NP), a digital signal processor (DSP), a microprocessor, a microcontroller, a programmable logic device (PLD), or any combination thereof. The processor may alternatively be any other apparatus having a processing function, for example, a circuit, a component, or a software module.

In this embodiment of the application, the communication line 302 may include a path, used to transmit information between the components included in the communications apparatus.

In this embodiment of the application, the transceiver 303 is configured to communicate with another device or communications network (for example, Ethernet, a radio access network (RAN), or a wireless local area network (WLAN)). The transceiver 303 may be a module, a circuit, a transceiver, or any apparatus that can implement communication.

In this embodiment of the application, the memory 304 may be a read-only memory (ROM) or another type of static storage device that can store static information and/or instructions, or may be a random access memory (RAM) or another type of dynamic storage device that can store information and/or instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto.

In a possible design, the memory 304 may be independent of the processor 301. In at least some embodiments, the memory 304 may be a memory outside the processor 301. In this case, the memory 304 may be connected to the processor 301 through the communication line 302, and is configured to store instructions or program code. When invoking and executing the instructions or the program code stored in the memory 304, the processor 301 can implement a reference signal management method provided in the following embodiments of the application. In another possible design, the memory 304 may alternatively be integrated with the processor 301. In at least some embodiments, the memory 304 may be an internal memory of the processor 301. For example, the memory 304 is a cache, and may be configured to temporarily store some data, instruction information, and/or the like.

In an implementation, the processor 301 may include one or more CPUs, for example, a CPU 0 and a CPU 1 in FIG. 3. In another implementation, the communications apparatus 300 may include a plurality of processors, for example, the processor 301 and a processor 307 in FIG. 3.

In still another implementation, when the communications apparatus shown in FIG. 3 is configured to perform the function performed by the terminal device, as shown in FIG. 3, the communications apparatus 300 may further include an output device 305 and an input device 306. For example, the input device 306 may be a device, for example, a keyboard, a mouse, a microphone, or a joystick, and the output device 305 may be a device, for example, a display screen or a speaker.

It should be noted that the communications apparatus 300 may be a general-purpose device or a dedicated device. For example, the communications apparatus 300 may be a desktop computer, a portable computer, a network server, a PDA, a mobile phone, a tablet computer, a wireless terminal device, an embedded device, a chip system, or a device having a structure similar to that in FIG. 3. A type of the communications apparatus 300 is not limited in this embodiment of the application. In this embodiment of the application, the chip system may include a chip, or may include a chip and another discrete component.

The following describes, based on the principle shown in FIG. 1 and with reference to the system shown in FIG. 2, a reference signal management method provided in an embodiment of the application. Each device in the following method embodiment may have components shown in FIG. 3, and details are not described again. In addition, a name of a message exchanged between network elements or a name of each parameter in a message in the following embodiment of the application is merely an example, and may also be another name in an embodiment. For example, the first information in the following embodiment may also be referred to as configuration information or the like. This is not limited in this embodiment of the application.

Figure 4:
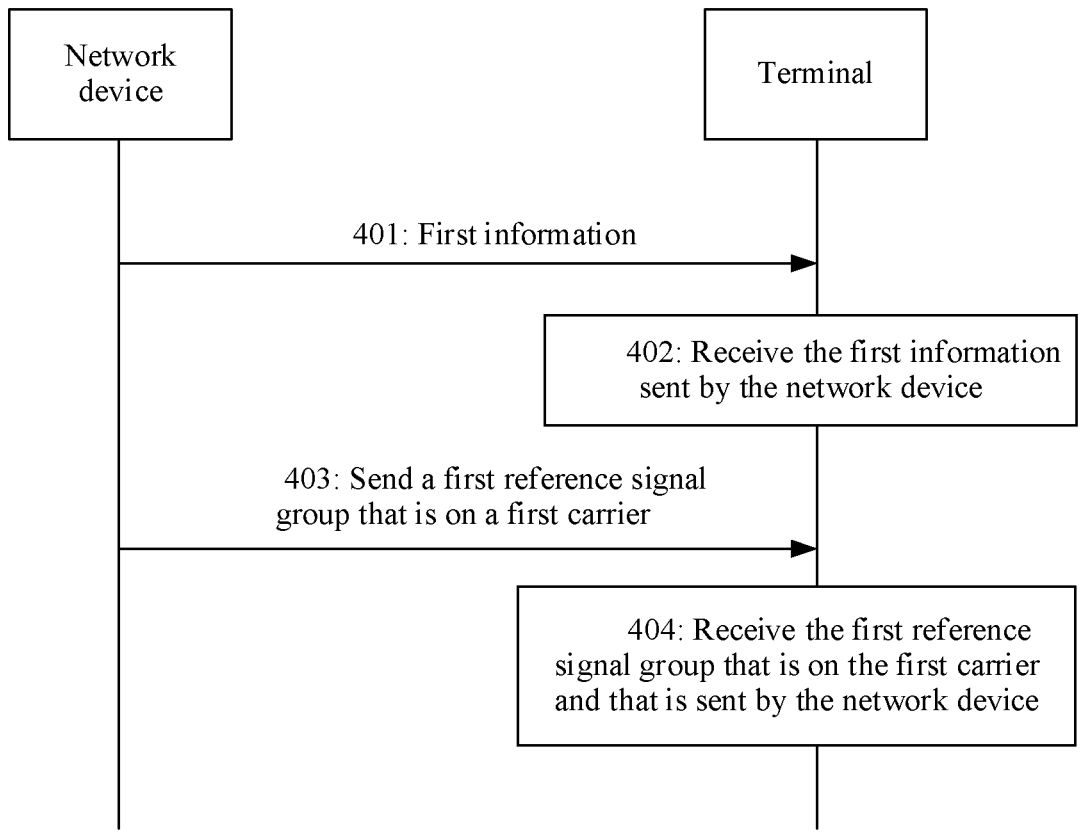
FIG. 4 is a flowchart of a reference signal management method according to an embodiment of the application.

FIG. 4 shows a reference signal management method according to an embodiment of the application. As shown in FIG. 4, the method may include the following operations.

Operation 401: A network device sends first information to a terminal device.

The network device may be the access network device in the system shown in FIG. 2. The terminal device may be any terminal device in the system shown in FIG. 2.

The first information may be used to indicate a first reference signal group that is on a first carrier. There is a correspondence between the first reference signal group that is on the first carrier and a first reference signal that is on a second carrier. For example, the first reference signal group that is on the first carrier has a quasi-co-location (QCL) relationship with the first reference signal that is on the second carrier. The terminal device may infer signal quality of the first reference signal that is on the second carrier based on signal quality of the first reference signal group that is on the first carrier. For example, that the first reference signal group that is on the first carrier has a QCL relationship with the first reference signal that is on the second carrier may include: The first reference signal group that is on the first carrier and the first reference signal that is on the second carrier have a same or similar communication characteristic, a direction of each reference signal in the first reference signal group that is on the first carrier and a direction of the first reference signal that is on the second carrier are the same or consistent (where energy concentration directions of the reference signals are the same), and each reference signal in the first reference signal group that is on the first carrier has a QCL relationship with the first reference signal that is on the second carrier with respect to one or more of the following parameters: an angle of arrival (AoA), an average AoA, an AoA spread, an angle of departure (AoD), an average AoD, an AoD spread, a receive antenna spatial correlation parameter, a transmit antenna spatial correlation parameter, a transmit beam, a receive beam, and the like.

The first carrier may be a carrier commonly used to transmit data or a primary carrier, the second carrier may be a carrier occasionally used to transmit data or a secondary carrier, and a band of the first carrier may be lower than a band of the second carrier. For example, the first carrier may be the foregoing low frequency carrier, and the second carrier may be the foregoing high frequency carrier. The first reference signal group that is on the first carrier may be uniquely identified by a group identifier (group ID), and different reference signal groups correspond to different group identifiers. The first reference signal group that is on the first carrier may include at least two reference signals. For example, the first reference signal group that is on the first carrier may include one pre-coded reference signal and one first-type reference signal (namely, a nulled reference signal), or may include two or more pre-coded reference signals and one first-type reference signal.

The first information may indicate one or more first reference signal groups that are on the first carrier, and the one or more first reference signal groups correspond to one or more first reference signals that are on the second carrier.

Pre-coded reference signals included in different first reference signal groups may be the same. First-type reference signals in different first reference signal groups are different. A direction of the first-type reference signal is the same as the direction of the first reference signal that is on the second carrier. For example, an energy concentration direction of the first-type reference signal is the same as an energy concentration direction of the first reference signal, or a difference between the energy concentration direction of the first-type reference signal and the energy concentration direction of the first reference signal is less than or equal to a preset angle. The preset angle may be set based on a requirement, for example, may be set to 1 degree. This is not limited. The first-type reference signal may be the nulled reference signal, the first-type reference signal may be uniquely identified by an ID of the first-type reference signal, and IDs of different nulled reference signals are different.

For example, it is assumed that there are three reference signals FR2 CSI-RSs {#1, #2, #3} on the high frequency carrier. In an example, the FR2 CSI-RS #1 and FR1 CSI-RSs {#alpha, #a} may be consistent in a transmit direction, the FR2 CSI-RS #2 and FR1 CSI-RSs {#alpha, #b} may be consistent in a transmit direction, and the FR2 CSI-RS #3 and FR1 CSI-RSs {#alpha, #c} may be consistent in a transmit direction. It can be learned from these correspondences that pre-coded reference signals may be the same signal FR1 CSI-RS #alpha, and three nulled reference signals are the FR1 CSI-RSs {#a, #b, #c} that correspond to the reference signals FR2 CSI-RSs {#1, #2, #3} that are on the high frequency carrier.

In still another example, the FR2 CSI-RS #1 and FR1 CSI-RSs {{#α, #β, #γ}, #a} may be consistent in a transmit direction, the FR2 CSI-RS #2 and FR1 CSI-RSs {{#α, #β, #γ}, #b} may be consistent in a transmit direction, and the FR2 CSI-RS #3 and FR1 CSI-RSs {{#α, #β, #γ}, #c} may be consistent in a transmit direction. The three pre-coded reference signals, that is, the FR1 CSI-RSs {#α, #β, #γ}, of the low frequency carrier may be three reference signals that are similar in directions, and the three nulled reference signals are FR1 CSI-RSs {#a, #b, #c} that correspond to the reference signals FR2 CSI-RSs {#1, #2, #3} that are on the high frequency carrier.

In this embodiment of the application, to indicate the first reference signal group that is on the first carrier and that corresponds to the first reference signal that is on the second carrier, the first information may include the correspondence between the first reference signal group that is on the first carrier and the first reference signal that is on the second carrier, may include a correspondence between a group identifier of the first reference signal group that is on the first carrier and an identifier of the first reference signal that is on the second carrier, or may include a correspondence between an identifier of the first-type reference signal included in the first reference signal group and an identifier of the first reference signal that is on the second carrier. This is not limited. These correspondences may be carried in the first information in a form of a list. In an embodiment, the first reference signal that is on the second carrier may be further configured as QCL information of the first reference signal group that is on the first carrier.

For example, it is assumed that the FR2 CSI-RS #1 corresponds to the FR1 CSI-RSs {#alpha, #a}, the FR2 CSI-RS #2 corresponds to the FR1 CSI-RSs {#alpha, #b}, and the FR2 CSI-RS #3 corresponds to the FR1 CSI-RSs {#alpha, #c}. A group identifier of the FR1 CSI-RSs {#alpha, #a} is a group ID1, a group identifier of the FR1 CSI-RSs {#alpha, #b} is a group ID2, and a group identifier of the FR1 CSI-RSs {#alpha, #c} is a group ID3. The network device may include correspondences shown in Table 1 in the first information, and send the first information to the terminal device. Alternatively, the network device may include correspondences shown in Table 2 in the first information and send the first information to the terminal device. Alternatively, the network device may include correspondences shown in Table 3 in the first information and send the first information to the terminal device.

TABLE 1

| First reference signal that is on the second carrier | First reference signal group that is on the first carrier |
| --- | --- |
| FR2 CSI-RS #1 | FR1 CSI-RS {#alpha, #a} |
| FR2 CSI-RS #2 | FR1 CSI-RS {#alpha, #b} |
| FR2 CSI-RS #3 | FR1 CSI-RS {#alpha, #c} |

TABLE 2

| ID of the first reference signal that is on the second carrier | Group ID of the first reference signal group that is on the first carrier |
| --- | --- |
| CSI-RS #1 | group ID1 |
| CSI-RS #2 | group ID2 |
| CSI-RS #3 | group ID3 |

TABLE 3

| ID of the first reference signal | ID of the first-type reference signal included in the first reference signal group |
| --- | --- |
| CSI-RS #1 | CSI-RS #a |
| CSI-RS #2 | CSI-RS #b |
| CSI-RS #3 | CSI-RS #c |

In an embodiment, before operation 401 is performed, the network device and the terminal device perform beam training on a beam used to carry the first reference signal that is on the second carrier, and find, based on a training result, one or more available beams that are on the high frequency carrier. When operation 401 is performed, the first reference signal that is on the second carrier and that corresponds to the first reference signal group that is on the first carrier in the first information is a reference signal having a direction consistent with a direction of a beam that is on the high frequency carrier and that is found based on the training result.

Operation 402: The terminal device receives the first information sent by the network device.

In an example, the terminal device may send a radio resource control (RRC) request to the network device. After receiving the RRC request sent by the terminal device, the network device includes the first information in an RRC message and sends the RRC message to the terminal device. The terminal device obtains the first information from the RRC message.

In still another example, after determining to transmit data by using the high frequency carrier, the network device may include the first information configured by the network device in a signaling message and send the signaling message to the terminal device, and the terminal device may obtain the first information from the signaling message. The signaling message may be a newly added message, or may be a message in an existing interaction procedure between the terminal device and the network device. This is not limited.

It should be noted that, after receiving the first information, the terminal device may obtain, from the first information, the first reference signal group that is on the first carrier and that corresponds to the first reference signal that is on the second carrier, and store the correspondence between the first reference signal that is on the second carrier and the first reference signal group that is on the first carrier in the terminal device, so that the terminal device sends feedback information and the like to the network device based on the correspondence.

Operation 403: The network device sends the first reference signal group that is on the first carrier.

For example, the network device may send the first reference signal group that is on the first carrier according to an existing manner of sending a reference signal. For example, the network device may determine a weight vector training target based on a main lobe direction of the beam of the second carrier, generate, by using a multi-objective optimization function and input parameters, a reference signal that is on the first carrier and that is closest to the training target, and carry the generated reference signal that is on the first carrier on a corresponding beam, to send the reference signal that is on the first carrier to the terminal device.

For example, the first carrier is a low frequency carrier, the second carrier is a high frequency carrier, a reference signal that is on the high frequency carrier is (a) in FIG. 1, a reference signal group that is on the low frequency carrier includes a pre-coded reference signal and a nulled reference signal, the pre-coded reference signal is (b) in FIG. 1, and the nulled reference signal is (c) in FIG. 1. That the network device sends the pre-coded reference signal that is on the low frequency carrier may include the following operations. Operation 1: Determine a main lobe direction (for example, an angle between a normal direction of an antenna array and the main lobe direction is 0 degrees) of a high frequency beam and a 3 dB beamwidth range (for example, 5 degrees) of the high frequency beam, as shown as (a) in FIG. 1.

Operation 2: Set a weight vector training target {target 1: Main lobe direction=Main lobe direction of the high frequency beam (for example, the angle between the normal direction and the main lobe direction is 0 degrees), target 2: First sidelobe suppression=20 dB} of the pre-coded reference signal based on the main lobe direction of the high frequency beam.

Operation 3: Use a multi-objective optimization function (for example, a non-dominated sorting genetic algorithm II (NSGAII algorithm)) and input parameters {an antenna array element quantity, an array element pattern, an array element spacing, and a training target}, to generate a pre-coded reference signal closest to the training target, where a pattern of the pre-coded reference signal is shown as (b) in FIG. 1.

That the network device sends the nulled reference signal that is on the low frequency carrier may include the following operations.

Operation 1: Determine a main lobe beam pattern (a normalized gain value corresponding to each angle from 0 to 360 degrees).

Operation 2: Set a nulled beam target pattern based on the main lobe beam pattern; for example, set a gain value of a part where the pre-coded reference signal of the low frequency carrier overlaps the 3 dB beamwidth range of the high frequency beam to −30 dB, increase a first sidelobe gain to −15 dB, and keep gain values at other angles unchanged.

Operation 3: Use a multi-objective optimization function (for example, an NSGAII algorithm) and input parameters {an antenna array element quantity, an array element pattern, an array element spacing, and a training target} to generate a nulled reference signal closest to a target pattern, where a pattern of the first-type reference signal is shown as (c) in FIG. 1.

Operation 404: The terminal device receives the first reference signal group that is on the first carrier and that is sent by the network device.

The terminal device may determine, based on an indication of the first information, the first reference signal group that is on the first carrier and that corresponds to the first reference signal that is on the second carrier, and receive the at least two reference signals that are on the first carrier.

In an embodiment, assuming that a main path direction estimated by using the first reference signal that is on the second carrier is 180 degrees, the terminal device may receive, in the 180-degree direction, the at least two reference signals that are on the first carrier and that correspond to the first reference signal that is on the second carrier.

Based on the method shown in FIG. 4, the network device may indicate a reference signal group that is on a low frequency carrier and that corresponds to a reference signal that is on a high frequency carrier to the terminal device, so that the terminal device receives the reference signal group that is on the low frequency carrier, determines the reference signal that is on the high frequency carrier by measuring the reference signal group that is on the low frequency carrier, and feeds back a determining result to the network device. In this way, when a beam that is on the high frequency carrier and that is used to transmit data is selected, a large quantity of reference signals that are on the high frequency carrier do not need to be configured, thereby reducing system overheads. In addition, the terminal device does not need to always enable a device channel for high frequency signal processing, thereby reducing complexity and power consumption of the terminal device.

Further, in the method shown in FIG. 4, when the first information is used to indicate a plurality of first reference signal groups that are on the first carrier, and the plurality of first reference signal groups correspond to a plurality of first reference signals that are on the second carrier, after the terminal device receives the plurality of first reference signal groups that are on the first carrier, the terminal device may measure signal quality of the plurality of first reference signal groups that are on the first carrier, determine, based on a measurement result, some first reference signals with optimal quality in the first reference signals that are on the second carrier, and feed back a determining result to the network device. In an embodiment, the method may include the following operation.

The terminal device measures the signal quality of the plurality of first reference signal groups, determines N first reference signal groups with optimal signal quality in the plurality of first reference signal groups, and sends feedback information to the network device.

N is a positive integer, and the feedback information may be used to indicate N first reference signals corresponding to the N first reference signal groups. For example, the feedback information may include an identifier of each of the N first reference signals, may include a group identifier of each of the N first reference signal groups corresponding to the N first reference signals, may include an identifier of a first-type reference signal included in each of the N first reference signal groups, or the like.

That the terminal device measures the signal quality of the first reference signal group that is on the first carrier may include: The terminal device uses a difference between a sum (or an accumulated value) of signal quality of reference signals, other than the first-type reference signal, in the first reference signal group and signal quality of the first-type reference signal as the signal quality of the first reference signal group; the terminal device may use a difference between a signal quality average value of reference signals, other than the first-type reference signal, in the first reference signal group and signal quality of the first-type reference signal as the signal quality of the first reference signal group; or the like.

For example, it is assumed that the first reference signal group includes a CSI-RS #α, a CSI-RS #β, and a CSI-RS #a, the CSI-RS #a is a first-type reference signal, and other reference signals are pre-coded reference signals. The signal quality of the first reference signal group may be equal to a sum of signal quality of the CSI-RS #α and signal quality of CSI-RS #β minus signal quality of the CSI-RS #a. Alternatively, the signal quality of the first reference signal group is equal to an average value of signal quality of the CSI-RS #α and signal quality of the CSI-RS #β minus signal quality of the CSI-RS #a.

A measurement indicator for measuring signal quality of a reference signal is not limited in this embodiment of the application. In at least some embodiments, the measurement indicator for measuring the signal quality of the reference signal may include any one of the following information: a reference signal received power (RSRP), reference signal received quality (RSRQ), a received signal strength indicator (RSSI), a block error rate (BLER), a signal to interference plus noise ratio (SINR), a channel quality indicator (CQI), and the like.

For example, it is assumed that the FR2 CSI-RS #1 corresponds to a reference signal group 1: FR1 CSI-RS {#alpha, #a}, the FR2 CSI-RS #2 corresponds to a reference signal group 2: FR1 CSI-RS {#alpha, #b}, and the FR2 CSI-RS #3 corresponds to a reference signal group 3: FR1 CSI-RS {#alpha, #c}. The CSI-RS #a, CSI-RS #b, and CSI-RS #c are first-type reference signals. After receiving the three reference signal groups, the terminal device obtains, through measurement, RSRPs of the three reference signal groups as follows: The RSRP of the reference signal group 2 is greater than the RSRP of the reference signal group 3, and the RSRP of the reference signal group 3 is greater than the RSRP of the reference signal group 1. In this case, the terminal device may determine that signal quality of the FR2 CSI-RS #2 corresponding to the reference signal group 2 is optimal, and feed back an ID of the FR2 CSI-RS #2 to the network device, or feed back a group identifier of the reference signal group 2 to the network device, or feed back an ID of the first-type reference signal CSI-RS #b included in the reference signal group 2 to the network device.

Further, in the method shown in FIG. 4, after the network device receives the feedback information sent by the terminal device, when the terminal device and the network device need to transmit data on the second carrier, the network device may select a target first reference signal from the N received first reference signals, and send data in a direction of the target first reference signal. In an embodiment, the implementation process may include the following operation.

The network device sends a scheduling indication to the terminal device on the first carrier, and the terminal device receives the scheduling indication sent by the network device on the first carrier, so that the terminal device receives, based on the scheduling indication, downlink data sent by the network device in the direction of the target first reference signal.

The scheduling indication may be used to indicate to send the downlink data in the direction of the target first reference signal, and the scheduling indication includes an identifier of the target first reference signal, a group identifier of a first reference signal group corresponding to the target first reference signal, or an identifier of a first-type reference signal included in a first reference signal group corresponding to the target first reference signal. The target first reference signal may be one of the N first reference signals with optimal signal quality.

In contrast to sending the downlink data, the network device may also send an uplink indication to the terminal device on the first carrier. After receiving the uplink indication sent by the network device on the first carrier, the terminal device sends uplink data in the direction of the target first reference signal that is on the second carrier based on the uplink indication.

The uplink indication may be used to indicate to send the uplink data in the direction of the target first reference signal, and the uplink indication includes the identifier of the target first reference signal, the group identifier of the first reference signal group corresponding to the target first reference signal, or the identifier of the first-type reference signal included in the first reference signal group corresponding to the target first reference signal. The target first reference signal may be one of the N first reference signals with optimal signal quality.

It should be noted that when the network device transmits another signal or channel (for example, an uplink control channel, a downlink control channel, a sounding signal, or a channel quality reference signal that is on the second carrier) in the direction of the target first reference signal (or on a beam used to transmit the target first reference signal), the network device may further include, in configuration information of the another signal or channel sent by the network device, the identifier of the target first reference signal, the group identifier of the first reference signal group corresponding to the target first reference signal, or the identifier of the first-type reference signal included in the first reference signal group corresponding to the target first reference signal, so that the terminal device learns, based on the configuration information, that the network device sends the another signal or channel in the direction of the target first reference signal.

In this way, data (for example, the downlink data or the uplink data) may be transmitted in a direction of a first reference signal that is determined by the terminal device and that is with optimal signal quality, thereby improving reliability and stability of data sending.

For example, the network device is an access network device, and the access network device sends downlink data. For example, the terminal device determines two reference signals: an FR2 CSI-RS #2 and an FR2 CSI-RS #3 from the first reference signals that are on the second carrier. After feeding back related information of the FR2 CSI-RS #2 and the FR2 CSI-RS #3 to the access network device, the access network device may determine that channel quality in a direction of the FR2 CSI-RS #2 and a direction of the FR2 CSI-RS #3 is optimal. The access network device may send the downlink data to the terminal device in the direction corresponding to the FR2 CSI-RS #2 or the direction corresponding to the FR2 CSI-RS #3. For example, the access network device sends the downlink data in the direction of the FR2 CSI-RS #2. The access network device first instructs the terminal device to send the downlink data in the direction of the FR2 CSI-RS #2, and then the access network device sends the downlink data to the terminal device in the direction of the FR2 CSI-RS #2. The terminal device receives, in the direction of the FR2 CSI-RS #2, the downlink data sent by the access network device.

Further, in the method shown in FIG. 4, when the terminal device needs to transmit uplink data on the second carrier, the terminal device may select a target first reference signal from the N received first reference signals, request the network device to schedule an uplink transmission resource of the second carrier, and send the uplink data in a direction of the target reference signal. In at least some embodiments, the process is as follows.

The terminal device sends a scheduling request to the network device on the first carrier. After receiving the scheduling request, the network device configures the uplink transmission resource for the terminal device, for example, configures an uplink transmission resource corresponding to the direction of the target first reference signal.

The scheduling request is used to request the uplink transmission resource that is on the second carrier and that is scheduled by the network device, and the scheduling request may include an identifier of the target first reference signal, a group identifier of a first reference signal group corresponding to the target first reference signal, or an identifier of a first-type reference signal included in a first reference signal group corresponding to the target first reference signal. The target first reference signal may be one of the N first reference signals with optimal signal quality.

For example, the terminal device determines two first reference signals: an FR2 CSI-RS #2 and an FR2 CSI-RS #3 from the first reference signals that are on the second carrier. When the terminal device needs to send uplink data, the terminal device may send a scheduling request to the network device to schedule an uplink transmission resource in a direction of the FR2 CSI-RS #2 or a direction of the FR2 CSI-RS #3. After the network device configures the uplink transmission resource for the terminal device, the terminal device sends the uplink data on the configured uplink transmission resource.

Further, in the method shown in FIG. 4, the method may further include the following operation.

The terminal device sends capability information of the terminal device to the network device, and the network device receives the capability information of the terminal device, where the capability information of the terminal device is used to indicate that the terminal device has a capability of determining the first reference signal that is on the second carrier by measuring the first reference signal group that is on the first carrier.

In this way, after receiving the capability information of the terminal device, the network device determines that the terminal device has the capability of determining the first reference signal that is on the second carrier by measuring the first reference signal group that is on the first carrier, and may implement the process shown in FIG. 4.

Further, in the method shown in FIG. 4, the method may further include the following operation.

The network device sends capability information of the network device to the terminal device, and the terminal device receives the capability information of the network device sent by the network device, where the capability information of the network device is used to indicate that the network device has a capability of sending the first reference signal group that is on the first carrier on the direction of the first reference signal that is on the second carrier.

In this way, after receiving the capability information of the network device, the terminal device may determine that the network device sends a reference signal that is on the first carrier in the direction of the first reference signal that is on the second carrier, but does not send the first reference signal that is on the second carrier, and the terminal device does not need to receive and measure the first reference signal that is on the second carrier. In this case, the terminal device may disable a radio frequency module (or a baseband processing module) that is of the terminal device and that is configured to receive the first reference signal that is on the second carrier, or a radio frequency module configured to receive the first reference signal that is on the second carrier is not designed in the terminal device, to reduce power consumption and design complexity of the terminal device.

For example, the terminal device disables the radio frequency module that is of the terminal device and that is configured to receive the first reference signal that is on the second carrier. Duration in which the terminal device disables the radio frequency module configured to receive the first reference signal that is on the second carrier may be determined based on a sleep cycle of the second carrier. When the duration in which the terminal device disables the radio frequency module configured to receive the first reference signal that is on the second carrier reaches the sleep cycle of the second carrier, the terminal device may restart the radio frequency module configured to receive the first reference signal that is on the second carrier, to receive and process a reference signal that is on a high frequency carrier.

The sleep cycle of the second carrier may include a discontinuous reception (DRX) parameter of the second carrier. The DRX parameter of the second carrier may include a DRX cycle, a drx-Inacitivity timer and a drx-onDurationTimer, and the like. For example, the network device may configure different sleep cycles of carriers (including the first carrier and the second carrier) for the terminal device. For example, the network may configure two different sets of DRX parameters of the first carrier and the second carrier for the terminal device. Compared with the first carrier, a longer DRX cycle may be configured for DRX of the second carrier, so that a radio frequency module/baseband processing module related to the second carrier of the terminal device may be in a sleep state for a relatively long time, to achieve an objective of reducing power consumption of the terminal device. In this embodiment of the application, a method in which the network configures a plurality of sets of DRX parameters for the terminal device may be adding, to a DRX configuration, a band identifier, a carrier identifier, a bandwidth part identifier, a low frequency or a high frequency identifier, FR1/FR2 differentiation information, or a combination thereof. This is not limited.

It should be noted that the foregoing method describes only a process in which the terminal device determines, by measuring a reference signal group that is on the first carrier, the first reference signal that is on the second carrier and that is sent by the network device. Correspondingly, in a scenario in which the terminal device sends a reference signal that is on the second carrier to the network device by using analog beamforming, to reduce system overheads, the network device also determines, by measuring a reference signal group that is on the first carrier, the first reference signal that is on the second carrier and that is sent by the terminal device. In at least some embodiments, for the process, refer to the method shown in FIG. 4. Details are not described again.

The foregoing mainly describes the solutions provided in the embodiments of the application from a perspective of interaction between nodes. It can be understood that, to implement the foregoing functions, the nodes such as the network device and the terminal device include corresponding hardware structures and/or software modules for executing the functions. One of ordinary skill in the art should easily be aware that, in combination with algorithm operations of the examples described in the embodiments disclosed in this specification, the application may be implemented by hardware or a combination of hardware and computer software. Whether a function is performed by hardware or hardware driven by computer software depends on particular applications and design constraints of the technical solutions. One of ordinary skill in the art may use different methods to implement the described functions of each particular application, but it should not be considered that the implementation goes beyond the scope of the application.

In the embodiments of the application, division into function modules may be performed on the network device and the terminal device based on the foregoing method example. For example, each function module may be obtained through division based on each corresponding function, or two or more functions may be integrated into one processing module. The integrated module may be implemented in a form of hardware, or may be implemented in a form of a software function module. It should be noted that, in the embodiments of the application, division into the modules is an example, and is merely logical function division. During actual implementation, another division manner may be used.

Figure 5:
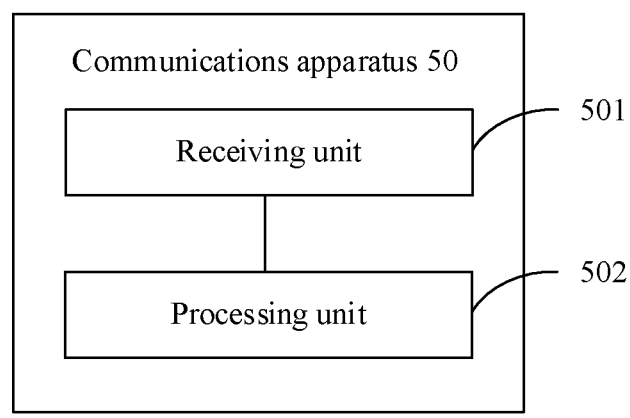
FIG. 5 is a schematic structural diagram of a communications apparatus according to an embodiment of the application.

FIG. 5 is a schematic structural diagram of a communications apparatus 50 according to an embodiment of the application. The communications apparatus 50 in this embodiment may be a terminal device or a chip or a system-on-a-chip in a terminal device. The communications apparatus 50 may be configured to perform functions of the terminal device in the foregoing method embodiment. In an implementation, as shown in FIG. 5, the communications apparatus 50 may include a receiving unit 501 and a processing unit 502.

The receiving unit 501 may be configured to receive first information sent by a network device, where the first information is used to indicate a first reference signal group that is on a first carrier, there is a correspondence between the first reference signal group that is on the first carrier and a first reference signal that is on a second carrier, and the first reference signal group that is on the first carrier includes at least two reference signals. For example, the receiving unit 501 may be configured to support the communications apparatus 50 in performing operation 402 and operation 404.

The processing unit 502 is configured to obtain the first information.

The receiving unit 501 is further configured to receive the first reference signal group that is on the first carrier and that is sent by the network device. For example, the receiving unit 501 may be configured to support the communications apparatus 50 in performing operation 404.

In at least some embodiments, the communications apparatus 50 provided in an embodiment of the application may perform actions of the terminal device in the method embodiment corresponding to FIG. 4. Implementation principles and technical effects thereof are similar, and details are not described herein again.

In still another possible implementation, the communications apparatus 50 shown in FIG. 5 may include a processing module and a communications module. A function of the processing unit 502 may be integrated into the processing module, and a function of the receiving unit 501 may be integrated into the communications module. The processing module is configured to control and manage an action of the communications apparatus 50. The communications module is configured to support the communications apparatus 50 in performing operation 402 and operation 404, and communicating with another network entity. Further, the communications apparatus 50 shown in FIG. 5 may further include a storage module, configured to store program code and data that are of the communications apparatus 50.

The processing module may be a processor or a controller. The processing module may implement or execute various example logical blocks, modules, and circuits described with reference to content disclosed in the application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is the processor, the communications module is the communications interface, and the storage module is the memory, the communications apparatus 50 shown in FIG. 5 may be the communications apparatus shown in FIG. 3.

In another implementation, an embodiment of the application further provides a communications apparatus. The communications apparatus may be a component (for example, a chip or a circuit) that may be used in a terminal device. The communications apparatus may include a processor. In an embodiment, the communications apparatus may further include a transceiver and a memory. The processor may be configured to implement a corresponding function and operation of the processing unit 502, and the transceiver may be configured to implement a corresponding function and operation of the receiving unit 501. The memory may be configured to store execution instructions or application program code, and the processor controls execution of the instructions or application program code, to implement the reference signal management method provided in the foregoing embodiments of the application, and/or may be configured to temporarily store some data, instruction information, and the like. The memory may exist independently of the processor. In this case, the memory may be connected to the processor through a communication line. In another possible design, the memory may alternatively be integrated with the processor. This is not limited in this embodiment of the application.

Figure 6:
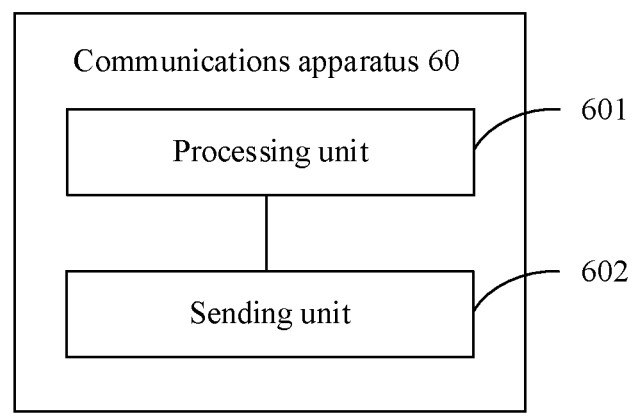
FIG. 6 is a schematic structural diagram of a communications apparatus according to an embodiment of the application.

FIG. 6 is a schematic structural diagram of a communications apparatus 60 according to an embodiment of the application. The communications apparatus in this embodiment may be a network device, or a chip or a system-on-a-chip in a network device. The communications apparatus 60 may be configured to perform functions of the network device in the foregoing method embodiment. In an implementation, as shown in FIG. 6, the communications apparatus may include a processing unit 601 and a sending unit 602.

The processing unit 601 is configured to determine first information, where the first information is used to indicate a first reference signal group that is on a first carrier, there is a correspondence between the first reference signal group that is on the first carrier and a first reference signal that is on a second carrier, and the first reference signal group that is on the first carrier includes at least two reference signals.

The sending unit 602 is configured to send the first information and the first reference signal group that is on the first carrier to a terminal device. For example, the sending unit 602 may be configured to support the communications apparatus 60 in performing operation 401 and operation 403.

In at least some embodiments, the communications apparatus 60 provided in this embodiment of the application may perform actions of the network device in an embodiment of the method corresponding to FIG. 4. Implementation principles and technical effects thereof are similar, and details are not described herein again.

In still another implementation, the communications apparatus 60 shown in FIG. 6 may include a processing module and a communications module. A function of the processing unit 601 may be integrated into the processing module, and a function of the sending unit 602 may be integrated into the communications module. The processing module is configured to control and manage an action of the communications apparatus 60. The communications module is configured to support the communications apparatus 60 in performing operation 401 and operation 403, and communicating with another network entity. Further, the communications apparatus 60 shown in FIG. 6 may further include a storage module, configured to store program code and data that are of the communications apparatus 60.

The processing module may be a processor or a controller. The processing module may implement or execute various example logical blocks, modules, and circuits described with reference to content disclosed in the application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is the processor, the communications module is the communications interface, and the storage module is the memory, the communications apparatus 60 shown in FIG. 6 may be the communications apparatus shown in FIG. 3.

In another implementation, an embodiment of the application further provides a communications apparatus. The communications apparatus may be a component (for example, a chip or a circuit) that may be used in a network device. The communications apparatus may include a processor. In an embodiment, the communications apparatus may further include a transceiver and a memory. The processor may be configured to implement a corresponding function and operation of the processing unit 601, and the transceiver may be configured to implement a corresponding function and operation of the sending unit 602. The memory may be configured to store execution instructions or application program code, and the processor controls execution of the instructions or application program code, to implement the reference signal management method provided in the foregoing embodiments of the application, and/or may be configured to temporarily store some data, instruction information, and the like. The memory may exist independently of the processor. In this case, the memory may be connected to the processor through a communication line. In another possible design, the memory may alternatively be integrated with the processor. This is not limited in this embodiment of the application.

Figure 7:
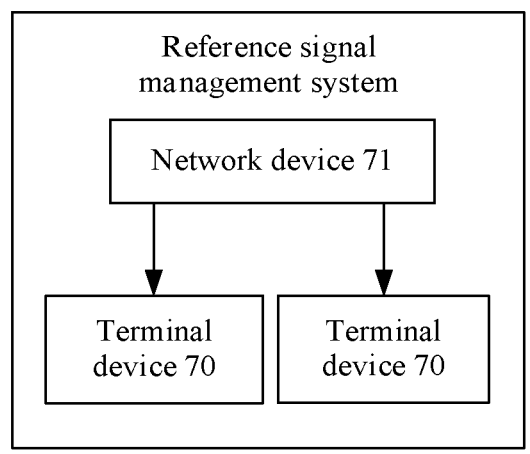
FIG. 7 is a schematic structural diagram of a reference signal management system according to an embodiment of the application.

FIG. 7 is a schematic structural diagram of a reference signal management system according to an embodiment of the application. As shown in FIG. 7, the system may include a plurality of terminal devices 70 and a network device 71.

A function of the terminal device 70 is the same as that of the communications apparatus 60 shown in FIG. 6, and a function of the network device 71 is the same as that of the communications apparatus 60 shown in FIG. 6. For example, the network device 71 is configured to send first information to the terminal device 70, where the first information is used to indicate a first reference signal group that is on a first carrier, there is a correspondence between the first reference signal group that is on the first carrier and a first reference signal that is on a second carrier, and the first reference signal group that is on the first carrier includes at least two reference signals.

The terminal device 70 is configured to receive the first information.

The network device 71 is further configured to send the first reference signal group that is on the first carrier to the terminal device 70.

The terminal device 70 is further configured to receive the first reference signal group that is on the first carrier.

In at least some embodiments, the reference signal management system may perform an embodiment of the method corresponding to FIG. 4. Implementation principles and technical effects thereof are similar, and details are not described again.

The foregoing descriptions about implementations allow one of ordinary skill in the art to understand that, for the purpose of convenient and brief description, division into the foregoing function modules is used as an example for illustration. In actual application, the foregoing functions can be allocated to different modules and implemented based on a requirement, that is, an inner structure of an apparatus is divided into different function modules to implement all or some of the functions described above.

In the several embodiments provided in the application, it should be understood that the disclosed apparatus and method may be implemented in other manners. For example, the described apparatus embodiment is merely an example. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate components may be or may not be physically separate, and components displayed as units may be one or more physical units, that is, may be located in one place, or may be distributed on a plurality of different places. Some or all of the units may be selected based on an actual requirement to achieve the objective of the solutions of the embodiments.

In addition, functional units in the embodiments of the application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of the application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the operations of the method described in the embodiments of the application. The foregoing storage medium includes: any medium that can store program code, such as a USB flash drive, a removable hard disk, a ROM, a RAM, a magnetic disk, or an optical disc.

The foregoing descriptions are merely embodiments of the application, but are not intended to limit the protection scope of the application. Any variation or replacement within the technical scope disclosed in the application shall fall within the protection scope of the application. Therefore, the protection scope of the application shall be subject to the protection scope of the claims.

What is claimed is:

1. A reference signal management method, comprising:
    receiving, by a terminal device, first information sent by a network device, wherein the first information is used to indicate a plurality of first reference signal groups on a first carrier, a correspondence between the plurality of first reference signal groups and a plurality of first reference signals on a second carrier, and the plurality of first reference signal groups comprise at least two reference signals;
    receiving, by the terminal device, the plurality of first reference signal groups sent by the network device;
    measuring, by the terminal device, signal quality of the plurality of first reference signal groups; and
    determining, by the terminal device, N first reference signal groups with optimal signal quality in the plurality of first reference signal groups.

2. The method according to claim 1, wherein
    a band of the first carrier is lower than a band of the second carrier.

3. The method according to claim 1, wherein one of the plurality of first reference signal groups comprise a first-type reference signal, a direction of the first-type reference signal is the same as a direction of one of the plurality of first reference signals, and in the direction of the first-type reference signal, the signal quality of the first-type reference signal is less than or equal to a preset threshold.

4. The method according to claim 1, wherein
    the first information comprises the correspondence between a first reference signal group included in the plurality of first reference signal groups and a first reference signal included in the plurality of first reference signals;
    the first information comprises a correspondence between a group identifier of the first reference signal group and an identifier of the first reference signal; or
    the first information comprises a correspondence between an identifier of a first-type reference signal in the first reference signal group and an identifier of the first reference signal.

5. The method according to claim 1, further comprising:
    sending, by the terminal device, feedback information to the network device, wherein the feedback information is used to indicate N first reference signals corresponding to the N first reference signal groups, wherein N is a positive integer.

6. The method according to claim 1, further comprising:
    receiving, by the terminal device, a scheduling indication sent by the network device on the first carrier, wherein the scheduling indication is used to indicate to send downlink data in a direction of a target first reference signal, and the scheduling indication comprises an identifier of the target first reference signal, a group identifier of one of the plurality of first reference signal groups corresponding to the target first reference signal, or an identifier of a first-type reference signal in a first reference signal group included in the plurality of first reference signal groups and corresponding to the target first reference signal.

7. The method according to claim 1, further comprising:
    sending, by the terminal device, a scheduling request to the network device on the first carrier, wherein the scheduling request is used to request the network device to schedule an uplink transmission resource of the second carrier for the terminal device, and the scheduling request comprises an identifier of a target first reference signal, a group identifier of one of the plurality of first reference signal groups corresponding to the target first reference signal, or an identifier of a first-type reference signal in a first reference signal group included in the plurality of first reference signal groups and corresponding to the target first reference signal.

8. A reference signal management method, comprising:
    sending, by a network device, first information to a terminal device, wherein the first information is used to indicate a plurality of first reference signal groups on a first carrier, a correspondence between the plurality of first reference signal groups on the first carrier and a plurality of first reference signals on a second carrier, and the plurality of first reference signal groups on the first carrier comprises at least two reference signals; and
    sending, by the network device, the plurality of first reference signal groups on the first carrier to the terminal device; and
    receiving, by the network device, feedback information sent from the terminal device, wherein the feedback information is used to indicate N first reference signals corresponding to N first reference signal groups with optimal signal quality in the plurality of first reference signal groups.

9. The method according to claim 8, wherein
    a band of the first carrier is lower than a band of the second carrier.

10. The method according to claim 8, wherein one of the plurality of first reference signal groups comprises a first-type reference signal, a direction of the first-type reference signal is the same as a direction of one of the plurality of first reference signals, and in the direction of the first-type reference signal, signal quality of the first-type reference signal is less than or equal to a preset threshold.

11. The method according to claim 8, wherein
    the first information comprises the correspondence between a first reference signal group included in the plurality of first reference signal groups and a first reference signal included in the plurality of first reference signals;
    the first information comprises a correspondence between a group identifier of the first reference signal group and an identifier of the first reference signal; or
    the first information comprises a correspondence between an identifier of a first-type reference signal in the first reference signal group and an identifier of the first reference signal.

12. The method according to claim 8, further comprising:
    sending, by the network device, a scheduling indication to the terminal device on the first carrier, wherein the scheduling indication is used to indicate to send downlink data in a direction of a target first reference signal, and the scheduling indication comprises an identifier of the target first reference signal, a group identifier of one of the plurality of first reference signal groups corresponding to the target first reference signal, or an identifier of a first-type reference signal in a first reference signal group included in the plurality of first reference signal groups and corresponding to the target first reference signal.

13. The method according to claim 8, further comprising:
receiving, by the network device, a scheduling request sent by the terminal device on the first carrier, wherein the scheduling request is used to request the network device to schedule an uplink transmission resource of the second carrier for the terminal device, and the scheduling request comprises an identifier of a target first reference signal, a group identifier of one of the plurality of first reference signal groups corresponding to the target first reference signal, or an identifier of a first-type reference signal in a first reference signal group included in the plurality of first reference signal groups and corresponding to the target first reference signal.

14. A terminal device, comprising:
a receiver; and
a processor coupled to the receiver that is configured to:
receive first information sent by a network device, wherein the first information is used to indicate a plurality of first reference signal groups on a first carrier, a correspondence between the plurality of first reference signal groups and a plurality of first reference signals on a second carrier, and the plurality of first reference signal groups comprise at least two reference signals and receive the first reference signal group sent by the network device;
measure signal quality of the plurality of first reference signal groups; and
determine N first reference signal groups with optimal signal quality in the plurality of first reference signal groups.

15. The terminal device according to claim 14, wherein a band of the first carrier is lower than a band of the second carrier.

16. The terminal device according to claim 14, wherein one of the plurality of first reference signal groups comprise a first-type reference signal, a direction of the first-type reference signal is the same as a direction of one of the plurality of first reference signals, and in the direction of the first-type reference signal, signal quality of the first-type reference signal is less than or equal to a preset threshold.

17. The terminal device according to claim 14, wherein
the first information comprises the correspondence between a first reference signal group included in the plurality of first reference signal groups and a first reference signal;
the first information comprises a correspondence between a group identifier of the first reference signal group and an identifier of the first reference signal included in the plurality of first reference signals; or
the first information comprises a correspondence between an identifier of a first-type reference signal in the first reference signal group and an identifier of the first reference signal.

* * * * *